United States Patent
Nakaso et al.

(10) Patent No.: US 9,283,962 B2
(45) Date of Patent: Mar. 15, 2016

(54) VEHICLE DRAWN DOWN STATE DETECTION DEVICE AND VEHICLE CONTROL DEVICE INCLUDING SAME

(75) Inventors: Hiroyuki Nakaso, Tokai (JP); Yosuke Hashimoto, Kariya (JP); Yukio Mori, Kariya (JP)

(73) Assignee: ADVICS CO., LTD., Kariya-Shi, Aichi-Ken (JP)

( * ) Notice: Subject to any disclaimer, the term of this patent is extended or adjusted under 35 U.S.C. 154(b) by 28 days.

(21) Appl. No.: 14/005,405

(22) PCT Filed: Mar. 16, 2012

(86) PCT No.: PCT/JP2012/056879
§ 371 (c)(1),
(2), (4) Date: Sep. 16, 2013

(87) PCT Pub. No.: WO2012/124806
PCT Pub. Date: Sep. 20, 2012

(65) Prior Publication Data
US 2014/0012471 A1    Jan. 9, 2014

(30) Foreign Application Priority Data
Mar. 16, 2011   (JP) ................. 2011-058200

(51) Int. Cl.
*B60W 30/18*   (2012.01)
*B60T 7/12*   (2006.01)
(Continued)

(52) U.S. Cl.
CPC .......... *B60W 30/18054* (2013.01); *B60T 7/122* (2013.01); *B60W 10/06* (2013.01);
(Continued)

(58) Field of Classification Search
USPC ............... 701/1, 70, 22, 51, 80, 93, 112, 119; 702/140, 142, 145, 148, 98
See application file for complete search history.

(56) References Cited

U.S. PATENT DOCUMENTS 6,338,398 B1   1/2002 Eguchi
2002/0046892 A1*   4/2002 Sakakiyama ................. 180/242
(Continued)

FOREIGN PATENT DOCUMENTS

JP   2000-351340 A   12/2000
JP   2005-261015 A   9/2005
(Continued)

OTHER PUBLICATIONS

International Preliminary Report on Patentability (Form PCT/IB/373) and the Written Opinion of the International Searching Authority (Translation)(Form PCT/ISA/237) issued on Sep. 17, 2013, in the corresponding International Application No. PCT/JP2012/056879. (5 pages).

(Continued)

*Primary Examiner* — Truc M Do
(74) *Attorney, Agent, or Firm* — Buchanan Ingersoll & Rooney PC

(57) ABSTRACT

An indirect longitudinal acceleration calculation section indirectly calculates longitudinal acceleration by calculating the longitudinal acceleration, which is an acceleration in a longitudinal direction of the vehicle, from change in the speed of the vehicle detected by a vehicle speed detection section. When an uphill travel detection section detects an uphill traveling state in which the vehicle is traveling on an uphill and a drive state determination section detects a no-driving-force state in which a vehicle driving force is not generated, a vehicle drawn down state detection section detects that the longitudinal acceleration indirectly calculated by the indirect longitudinal acceleration calculation section is oriented in an accelerating direction, and determines that the vehicle is in a drawn down state.

4 Claims, 4 Drawing Sheets

(51) Int. Cl.
*B60W 10/06* (2006.01)
*B60W 10/184* (2012.01)

(52) U.S. Cl.
CPC ...... *B60W 10/184* (2013.01); *B60W 30/18018* (2013.01); *B60W 30/18118* (2013.01); *B60T 2201/06* (2013.01); *B60W 2520/10* (2013.01); *B60W 2520/105* (2013.01); *B60W 2710/182* (2013.01)

(56) References Cited

U.S. PATENT DOCUMENTS

| | | | | |
|---|---|---|---|---|
| 2004/0231951 | A1* | 11/2004 | Hasegawa et al. | 192/220 |
| 2005/0014605 | A1* | 1/2005 | Ries-Mueller | 477/71 |
| 2005/0090938 | A1* | 4/2005 | Ranelli | 701/1 |
| 2005/0140208 | A1* | 6/2005 | Ji | 303/192 |
| 2005/0246081 | A1* | 11/2005 | Bonnet et al. | 701/38 |
| 2006/0208566 | A1* | 9/2006 | Ohtsu | 303/191 |
| 2007/0038356 | A1* | 2/2007 | Braunberger et al. | 701/70 |
| 2007/0208524 | A1* | 9/2007 | Niepelt et al. | 702/85 |
| 2008/0058156 | A1* | 3/2008 | Kakisaka et al. | 477/110 |
| 2008/0140291 | A1* | 6/2008 | Kobayashi et al. | 701/70 |
| 2008/0195289 | A1* | 8/2008 | Sokoll | 701/70 |
| 2009/0018739 | A1* | 1/2009 | Ohmori et al. | 701/70 |
| 2009/0037129 | A1* | 2/2009 | Kretschmann et al. | 702/96 |
| 2009/0187324 | A1* | 7/2009 | Lu et al. | 701/94 |
| 2010/0131140 | A1* | 5/2010 | Wu et al. | 701/29 |
| 2010/0268416 | A1* | 10/2010 | Arai et al. | 701/35 |
| 2010/0318255 | A1* | 12/2010 | Li et al. | 701/29 |
| 2010/0332101 | A1* | 12/2010 | Braunberger et al. | 701/96 |
| 2011/0066320 | A1* | 3/2011 | Bechtler et al. | 701/34 |
| 2011/0208402 | A1* | 8/2011 | Sladek, Jr. | 701/102 |
| 2011/0218699 | A1* | 9/2011 | Petzold | 701/22 |
| 2012/0029781 | A1* | 2/2012 | Dickinson et al. | 701/70 |
| 2012/0049617 | A1* | 3/2012 | Furuyama | 303/9.75 |
| 2012/0143399 | A1* | 6/2012 | Noumura et al. | 701/1 |
| 2013/0151074 | A1* | 6/2013 | Takeuchi et al. | 701/37 |
| 2013/0179002 | A1* | 7/2013 | Tohta | 701/1 |

FOREIGN PATENT DOCUMENTS

| | | |
|---|---|---|
| JP | 2008-179280 A | 8/2008 |
| JP | 2008-215139 A | 9/2008 |

OTHER PUBLICATIONS

International Search Report (PCT/ISA/210) mailed on May 15, 2012, by the Japanese Patent Office as the International Searching Authority for International Application No. PCT/JP2012/056879.

Written Opinion (PCT/ISA/237) mailed on May 15, 2012, by the Japanese Patent Office as the International Searching Authority for International Application No. PCT/JP2012/056879.

* cited by examiner

VEHICLE DRAWN DOWN STATE DETECTION DEVICE AND VEHICLE CONTROL DEVICE INCLUDING SAME

TECHNICAL FIELD

The present invention relates to a vehicle drawn down state detection device for detecting a vehicle "drawn down" state in which a vehicle moves downward on an uphill gradient. The present invention also relates to a vehicle control device having the vehicle drawn down state detection device.

BACKGROUND ART

In the past, an engine idle stop control device was proposed in PTL 1. This device brings a vehicle to an idling stop for purposes, for instance, of fuel consumption reduction when predetermined conditions are met. When braking force becomes smaller than the force of rolling backward on a gradient, this device detects the vehicle drawn down state and restarts an engine of the vehicle to inhibit the vehicle from rolling away.

Further, a braking force hold device was proposed in PTL 2. When a wheel speed pulse is input after a vehicle is brought to a standstill, this device detects a drawn down and starts an engine of the vehicle to inhibit the vehicle from rolling away.

CITATION LIST

Patent Literature

[PTL 1]
Japanese Patent Application Publication No. JP-A-2008-215139
[PTL 2]
Japanese Patent Application Publication No. JP-A-2000-351340

SUMMARY OF INVENTION

Technical Problem

However, the device described in PTL 1, which detects the vehicle drawn down state in accordance with the relationship between the braking force and the force of rolling backward on a gradient, may fail to accurately detect the vehicle drawn down state because the braking force for keeping the vehicle in a standstill varies, for instance, with the payload on the vehicle. Hence, the device described in PTL 1 may fail to precisely inhibit the vehicle from rolling away.

Further, when the device described in PTL 2, which uses the wheel speed pulse, is used, the wheel speed pulse is successively input at varying intervals if the vehicle traveling on an uphill is drawn down. Hence, the device described in PTL 2 may fail to inhibit the vehicle from rolling away as it might not be able to detect the vehicle in a standstill.

In light of the foregoing, it is an object of the present invention to provide a vehicle drawn down state detection device capable of accurately detecting the drawn down state of the vehicle and a vehicle control device having such a vehicle drawn down state detection device.

Solution to Problem

In order to achieve the above-described object, according to a first aspect of the present invention, there is provided a vehicle drawn down state detection device. An indirect longitudinal acceleration calculation means indirectly calculates longitudinal acceleration by calculating the longitudinal acceleration, which is an acceleration in a longitudinal direction of the vehicle, from change in the speed of the vehicle detected by a vehicle speed detection means. When an uphill travel detection means detects an uphill traveling state in which the vehicle is traveling on an uphill and a drive state determination means detects a no-driving-force state in which a vehicle driving force is not generated, a vehicle drawn down state detection means detects that the longitudinal acceleration indirectly calculated by the indirect longitudinal acceleration calculation means is oriented in an accelerating direction, and determines that the vehicle is in a drawn down state.

As described above, when, in the uphill traveling state where the vehicle travels on an uphill, the vehicle is in the no-driving-force state where the driving force directed in the direction of uphill is not generated and the longitudinal acceleration is oriented in the accelerating direction, the vehicle drawn down state detection device detects the vehicle drawn down state. This makes it possible to accurately detect the vehicle drawn down state without being affected by the payload on the vehicle.

According to a second aspect of the present invention, there is provided the vehicle drawn down state detection device, wherein, when at least one of a stopped engine, a disengaged clutch, and a transmission in neutral position is detected, the drive state determination means determines that the vehicle is in the no-driving-force state.

As described above, when at least one of a stopped engine, a disengaged clutch, and a transmission in neutral position is detected, the drive state determination means determines that the vehicle is in the no-driving-force state.

According to a third aspect of the present invention, there is provided the vehicle drawn down state detection device, wherein, if change occurs in a polarity of the longitudinal acceleration including a gravitational acceleration detected by a direct longitudinal acceleration detection means when the longitudinal acceleration indirectly calculated by the indirect longitudinal acceleration calculation means is oriented in the accelerating direction, the vehicle drawn down state detection means does not determine that the vehicle is in the vehicle drawn down state.

As described above, if a polarity change occurs in the directly detected longitudinal acceleration including the gravitational acceleration in a situation where a brake pedal is depressed during a travel on an uphill, it is found that a road on which the vehicle is traveling has changed from the uphill to a downhill. Hence, if a polarity change occurs in the directly detected longitudinal acceleration including the gravitational acceleration when the indirectly calculated longitudinal acceleration is oriented in the accelerating direction, the vehicle drawn down state detection device does not determine that the vehicle is in the vehicle drawn down state. This makes is possible to avoid a situation where the vehicle drawn down state is erroneously detected.

According to a fourth aspect of the present invention, there is provided a vehicle control device that includes the vehicle drawn down state detection device described in any one of the first to third aspects and exercises vehicle control in accordance with the result of detection by the vehicle drawn down state detection device, the vehicle control device including an engine start means. The engine start means exercises idle stop control for purpose of the vehicle control so as to automatically stop an engine when stopping the vehicle and automatically restart the engine when starting the vehicle. If the vehicle drawn down state is detected by the vehicle drawn down state detection device during the idle stop control, the engine start means starts the engine.

As idle stop control is exercised to restart the engine in accordance with the result of detection by the vehicle drawn down state detection device, which is capable of accurately detecting the vehicle drawn down state as described above, it is possible to precisely inhibit the vehicle from rolling away.

According to a fifth aspect of the present invention, there is provided the vehicle control device including a braking force increase means. When the vehicle drawn down state is detected by the vehicle drawn down state detection device, the braking force increase means exercises control for purpose of the vehicle control so as to increase a braking force of the vehicle.

As described above, when hill hold control is exercised to increase the braking force in accordance with the result of detection by the vehicle drawn down state detection device, which is capable of accurately detecting the vehicle drawn down state as described above, it is also possible to precisely inhibit the vehicle from rolling away.

DESCRIPTION OF EMBODIMENTS

Figure 1:
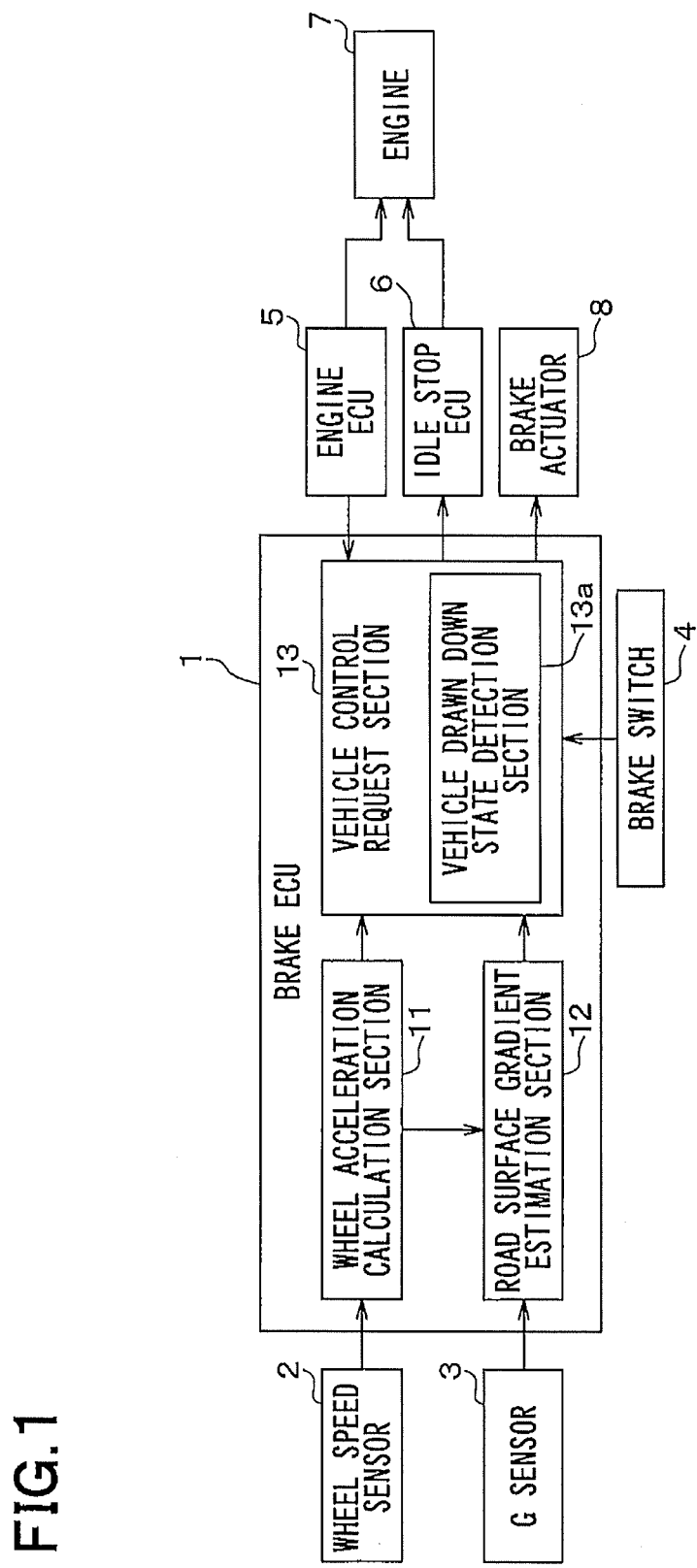
FIG. 1 is a block diagram illustrating the configuration of a vehicle control system to which a vehicle drawn down state detection device according to a first embodiment of the present invention is applied.

Embodiments of the present invention will now be described with reference to the accompanying drawings. As regards the embodiments described below, elements identical or similar to each other are designated by the same reference signs in the drawings.

First Embodiment

A first embodiment of the present invention will now be described. The present embodiment will be described with reference to a case where a vehicle drawn down state detection device is applied to a vehicle control system in which vehicle control, such as idle stop control or hill hold control, is exercised.

FIG. 1 is a block diagram illustrating the configuration of the vehicle control system to which the vehicle drawn down state detection device according to the present embodiment is applied. The configuration of the vehicle control system is described below with reference to FIG. 1.

As shown in FIG. 1, the vehicle control system uses a brake ECU (electronic control unit) 1 to detect for a vehicle drawn down state, and exercises vehicle control functions, such as engine control and brake control functions, in accordance with the result of detection for the vehicle drawn down state. The brake ECU 1 exercises general brake control functions, such as an anti-skid control function. However, only a vehicle drawn down state detection function and the vehicle control functions related to the vehicle drawn down state detection function will be described here.

The brake ECU 1 not only inputs detection signals from wheel speed sensors 2 and from a longitudinal acceleration sensor (hereinafter referred to as the G sensor) 3, but also inputs a switch signal from a brake switch (BRK) 4 and information from an engine ECU 5. In accordance with these inputs, the brake ECU 1 detects the vehicle drawn down state.

More specifically, the brake ECU 1 includes a wheel acceleration calculation section 11, a road surface gradient estimation section 12, and a vehicle control request section 13. The vehicle control request section 13 includes a vehicle drawn down state detection section 13a for detecting the vehicle drawn down state. In the present embodiment, the sections 11-13 included in the brake ECU 1 operate to detect the vehicle drawn down state. These sections 11-13 form the vehicle drawn down state detection device. Here, it is assumed that the brake ECU 1 detects the vehicle drawn down state. Alternatively, however, another ECU or the like may be used to detect the vehicle drawn down state.

The wheel acceleration calculation section 11 calculates a wheel speed in accordance with the detection signals input from the wheel speed sensors 2. The brake ECU 1 inputs a pulse signal as the detection signal, which is output from each wheel speed sensor 2 in accordance with wheel rotation. Therefore, the wheel acceleration calculation section 11 not only calculates the wheel speed Vw of each wheel in accordance with the number of pulses of the pulse signal, but also calculates wheel acceleration dVw by determining the rate of change (derivative) in the wheel speed Vw. In this instance, the wheel speed Vw and the wheel acceleration dVw are calculated. However, the vehicle drawn down contemplated in conjunction with the present embodiment is a vehicle movement that occurs at a low vehicle speed close to zero. Therefore, the wheel speed Vw is equal to a vehicle speed and the wheel acceleration dVw is equal to vehicle acceleration. Hence, the calculations of the wheel speed Vw and of the wheel acceleration dVw are substantially equivalent to the calculations of the vehicle speed and of the vehicle acceleration.

It is assumed that the present embodiment calculates an increase in the speed as positive acceleration dVw and a decrease in the speed as negative wheel acceleration dVw no matter whether the vehicle is traveling forward or backward.

The road surface gradient estimation section 12 estimates a road surface gradient in accordance with the detection signal input from the G sensor 3 and with the wheel acceleration dVw calculated by the wheel acceleration calculation section 11. In other words, the longitudinal acceleration G, which is detected by the G sensor 3 and represents an acceleration of the vehicle in the lateral (front-to-rear) direction of the vehicle, is an output that is obtained by adding a gravitational acceleration based on the road surface gradient to the vehicle acceleration. Therefore, the gravitational acceleration based on the road surface gradient is obtained by calculating the longitudinal acceleration G from the detection signal of the G sensor 3 and subtracting the vehicle acceleration from the longitudinal acceleration G. As the vehicle acceleration is equal to the wheel acceleration dVw calculated by the wheel acceleration calculation section 11, the gravitational acceleration based on the road surface gradient can be calculated by subtracting the wheel acceleration dVw from the longitudinal acceleration G. The road surface gradient can then be estimated in accordance with the gravitational acceleration based on the road surface gradient. Although an exemplary method of estimating the road surface gradient is described above, any well-known method may be used to estimate the road surface gradient. If, for example, map data for a navigation device includes data about a road surface gradient, the included data may be used to determine the road surface gradient.

The vehicle control request section 13 not only uses the vehicle drawn down state detection section 13*a* to detect for a vehicle drawn down state, but also exercises vehicle control functions, such as engine control and brake control functions, in accordance with the result of detection for the vehicle drawn down state. The vehicle drawn down state detection section 13*a* detects the vehicle drawn down state in accordance with information about the operating state of an engine handled by the engine ECU 5 and with the switch signal supplied from the brake switch 4 to indicate a depressed brake pedal. The method of detecting the vehicle drawn down state will be described in detail later. In any event, when the vehicle drawn down state detection section 13*a* determines that the vehicle is in a drawn down state, the vehicle control request section 13 exercises idle stop control to restart the engine and hill hold control to increase braking force accordingly. When, for instance, the vehicle is found to be in the drawn down state, a request signal for starting the engine is output to an idle stop ECU 6 to restart a stopped engine 7. Creep torque is then generated to inhibit the vehicle from rolling away. Alternatively, when the vehicle is found to be in the drawn down state, a request signal for increasing the braking force is output to a brake actuator (ACT) 8. The braking force is then applied to the vehicle to inhibit the vehicle from rolling away.

The engine ECU 5 exercises general engine control in which, for example, the opening of a throttle valve is adjusted in accordance with the amount of accelerator pedal depression to obtain desired engine power. Therefore, the engine ECU 5 knows about the operating state of the engine. Information indicative of the engine's operating state is input from the engine ECU 5 to the vehicle control request section 13. Further, the idle stop ECU 6 exercises idle stop control. More specifically, if, for instance, the brake pedal is found to be depressed when the vehicle speed is not higher than a predetermined threshold value, the idle stop ECU 6 stops the engine 7 as it determines that an action is taken to bring the vehicle to a standstill, and if, for instance, the accelerator pedal is depressed, the idle stop ECU 6 restarts the engine 7 as it determines that an action is taken to start the vehicle. Therefore, when the vehicle drawn down state detection section 13*a* determines that the vehicle is in the drawn down state, the vehicle control request section 13 restarts the engine 7 by requesting the idle stop ECU 5 to start the engine.

The vehicle control system to which the vehicle drawn down state detection device according to the present embodiment is applied is configured as described above. Next, a vehicle drawn down state detection process performed by the brake ECU 1 included in the vehicle control system, which is configured as described above, will be described.

Figure 2:
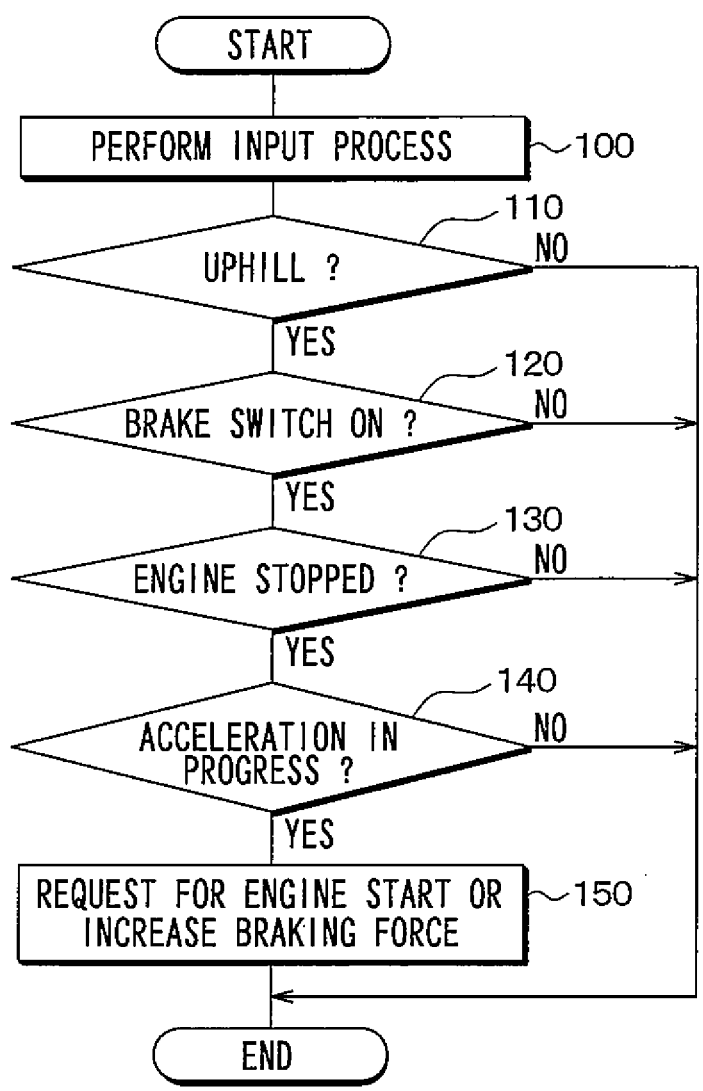
FIG. 2 is a flowchart illustrating in detail a vehicle drawn down state detection process.

FIG. 2 is a flowchart illustrating in detail the vehicle drawn down state detection process. The vehicle drawn down state detection process shown in FIG. 2 is performed on each predetermined control cycle when idle stop control or hill hold control is exercised.

First of all, an input process is performed in step 100. This process is performed by the wheel acceleration calculation section 11 and road surface gradient estimation section 12 included in the brake ECU 1. More specifically, the detection signals are input from the wheel speed sensor 2 and from the G sensor 3, information about the stoppage of the engine 7 is input from the engine ECU 5, and the switch signal is input from the brake switch 4. Further, the wheel acceleration dVw is calculated by calculating the wheel speed Vw from the detection signal input from the wheel speed sensor 2 and differentiating the calculated wheel speed Vw (or determining the difference from the wheel speed Vw calculated on the last control cycle). Furthermore, the longitudinal acceleration G is calculated in accordance with the detection signal input from the G sensor 3. Eventually, the road surface gradient is estimated by performing calculations in accordance with the difference between the calculated longitudinal acceleration G and the wheel acceleration dVw.

Next, steps 110 and beyond are performed to detect for a vehicle drawn down state. This process is performed by the vehicle drawn down state detection section 13*a*. More specifically, step 110 is performed to determine whether the vehicle is traveling on an uphill. This determination step is performed in accordance with the road surface gradient determined in step 100 in which the road surface gradient is estimated by performing calculations. If the vehicle is traveling in the direction of uphill, it is determined that the vehicle is traveling on an uphill. If it is determined that the vehicle is traveling on an uphill, processing proceeds to step 120 because the vehicle might be placed in the drawn down state. If, on the other hand, it is not determined that the vehicle is traveling on an uphill, processing comes to an immediate end because the vehicle is not likely to be in the drawn down state.

Step 120 is performed to determine whether the brake switch 4 is on. This determination step is performed in accordance with the switch signal input from the brake switch 4. As idle stop control and hill hold control are exercised on condition that the brake pedal is depressed, this determination step is performed for verification purposes. However, as the vehicle drawn down state detection process is performed when idle stop control or hill hold control is exercised, this determination step may be skipped. If the determination result obtained in step 120 is affirmative, processing proceeds to step 130. If, on the other hand, the determination result obtained in step 120 is negative, processing comes to an immediate end because the vehicle drawn down state detection process need not be performed.

Step 130 is performed to determine whether the engine is stopped. When the engine is stopped, the vehicle is in a no-driving-force state where the driving force directed in the direction of uphill is not generated. In the no-driving-force state, the vehicle may be placed in the vehicle drawn down state. Therefore, when the engine is stopped, processing proceeds to step 140 in order to determine whether acceleration is in progress. These determination steps are performed in accordance with the information sent from the engine ECU 5, which is input in step 100, and with the wheel acceleration dVw calculated in step 100.

Whether or not acceleration is in progress is determined by whether or not the absolute value of the wheel acceleration dVw is increasing. More specifically, when the vehicle is about to stop on an uphill, the vehicle speed decreases. Therefore, the wheel acceleration dVw (namely, the vehicle acceleration) takes a negative value. When the vehicle is stopping, its speed gradually decreases until it becomes 0 (zero) in the end. In this instance, the wheel acceleration dVw also changes to 0 (zero). When a vehicle drawn down occurs, the speed of the vehicle gradually increases so that the wheel acceleration dVw takes a positive value. In other words, when the vehicle traveling on an uphill comes to a stop and goes into a vehicle drawn down state, the vehicle speed positive in the direction of uphill (in a forward direction) gradually decreases, and then the vehicle speed positive in a direction opposite to the direction of uphill (in a backward direction) gradually increases. Therefore, the wheel acceleration dVw changes from a decelerating direction to an accelerating direction. Hence, when the wheel acceleration dVw takes a positive value, it is determined that acceleration is in progress. Alternatively, when the wheel acceleration dVw changes from a negative value (deceleration) to a positive value (acceleration), it may be determined that acceleration is in progress.

The vehicle may accelerate on an uphill with its engine stopped only when the vehicle is in the vehicle drawn down state. More specifically, a state where the engine is stopped is the no-driving-force state in which no driving force is generated. Therefore, the propulsion force directed forward of the vehicle is not generated. In this state, acceleration of the vehicle is a result of drawn down of the vehicle due to gravity. Hence, steps 130 and 140 are performed to determine whether the conditions under which the vehicle is placed in the vehicle drawn down state are met. If the conditions are met, processing proceeds to step 150. If, on the other hand, the conditions are not met, processing comes to an immediate end because the vehicle is not in the vehicle drawn down state.

In step 150, an appropriate output is generated to inhibit the vehicle from rolling away. More specifically, if the vehicle drawn down state detection process is performed during idle stop control, an engine start request is output. On the other hand, if the vehicle drawn down state detection process is performed during hill hold control, an output for increasing the braking force is generated. Upon completion of step 150, processing comes to an end.

As a result, if the engine start request is output, the idle stop ECU 6 restarts the engine 7 upon receipt of the output engine start request. If, on the other hand, the output for increasing the braking force is generated, the brake actuator 8 is driven to increase the braking force. In a system in which a wheel cylinder is automatically pressurized by a liquid pressure medium, for example, a motor is driven to let a pressurizing pump perform an intake-discharge operation, and various control valves are set in a valve position for pressuring the wheel cylinder so that a brake fluid discharged from the pump pressurizes the wheel cylinder to increase the braking force. As described above, the vehicle drawn down can be inhibited by using the creep torque generated upon engine restart or by applying the braking force to the vehicle.

Figure 3:
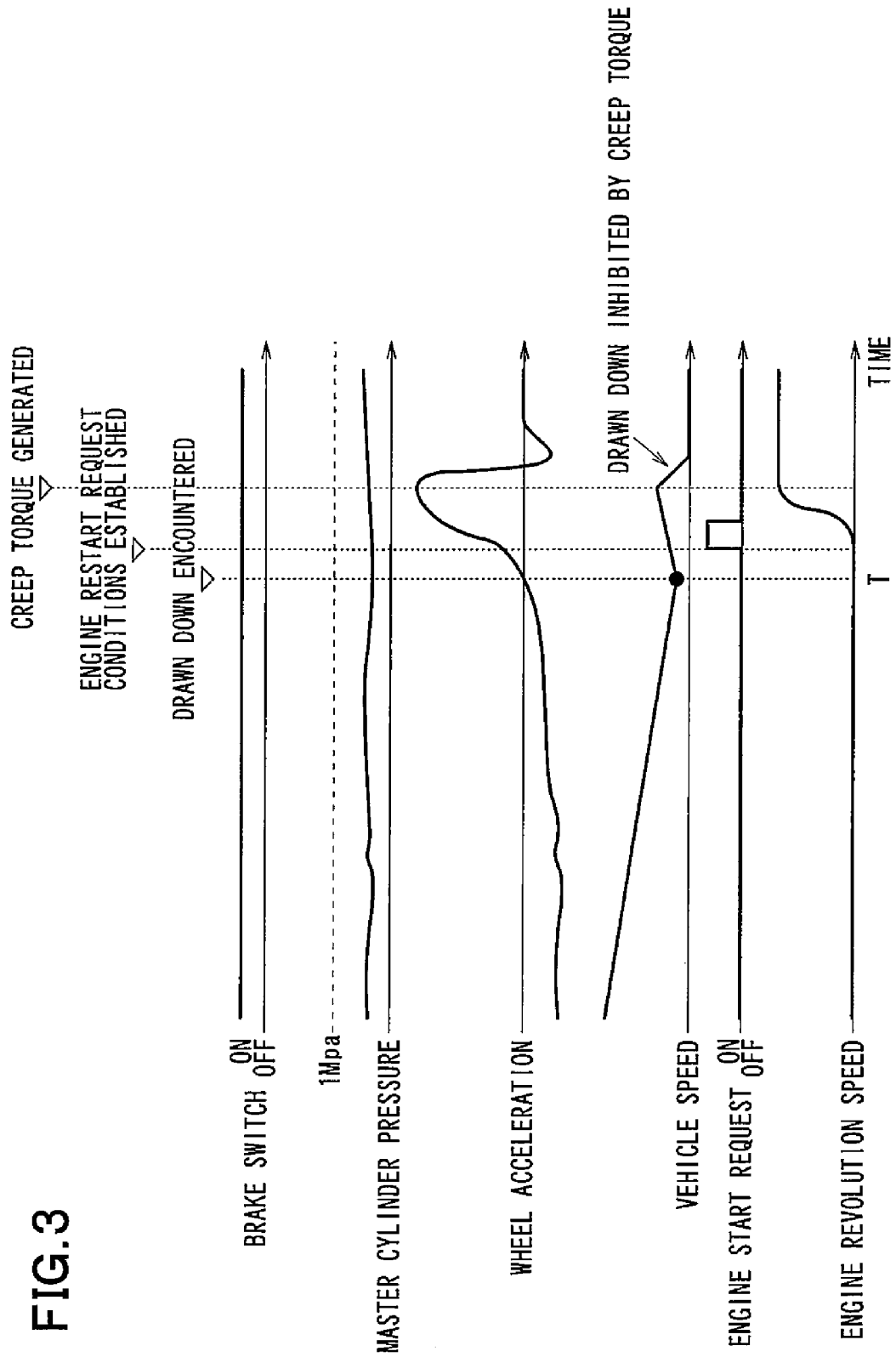
FIG. 3 is a timing diagram illustrating the vehicle drawn down state detection process that is performed during idle stop control.

FIG. 3 is a timing diagram illustrating the vehicle drawn down state detection process that is performed during idle stop control.

If the brake pedal is depressed until the vehicle speed is not higher than the predetermined threshold value while the vehicle is traveling, idle stop control is exercised. In this instance, as show in FIG. 3, while a master cylinder pressure is generated with the brake switch 4 turned on and with the brake pedal depressed, the engine 7 stops to reduce the engine revolution speed to 0 (zero), thereby gradually decreasing the vehicle speed. Further, a negative value is generated as the wheel acceleration dVw. In other words, the absolute value of the wheel acceleration dVw, which is |dVw|, gradually decreases.

Subsequently, when the vehicle is placed in the vehicle drawn down state at time T, the wheel acceleration dVw changes from the decelerating direction to the accelerating direction, and increases to take a positive value at the same time the vehicle goes into the vehicle drawn down state. As the resulting state is a state where acceleration is in progress while the vehicle is on an uphill with the brake switch 4 turned on and with the engine stopped. Consequently, the engine start request is issued because the vehicle is found to be in the vehicle drawn down state. As a result, the engine 7 is restarted to generate the creep torque and inhibit the vehicle from rolling away.

In FIG. 3, the vehicle speed in not 0 (zero) immediately before the vehicle is placed in the vehicle drawn down state. The reason is that the pulse signal of the wheel speed sensor 2 does not permit the accurate detection of a vehicle speed of 0 (zero). Further, the vehicle speed is increased as a positive value when the vehicle is placed in the vehicle drawn down state. The reason is that the vehicle speed is expressed as a positive value even when the vehicle is traveling in the backward direction.

As described above, if, in a situation where the vehicle is traveling on an uphill, the wheel acceleration dVw (i.e., vehicle acceleration) takes a positive value while the no-driving-force state prevails because the driving force directed in the direction of uphill is not generated, the present embodiment determines that the vehicle is in the vehicle drawn down state. (Alternatively, when the wheel acceleration dVw changes from the decelerating direction to the accelerating direction, the present embodiment may determine that the vehicle is in the vehicle drawn down state.) This makes it possible to accurately detect the vehicle drawn down state without being affected by the payload on the vehicle.

In accordance with the result of accurate detection of the vehicle drawn down state, it is possible to inhibit the vehicle from rolling away by restarting the engine during idle stop control or by increasing the braking force during hill hold control.

Other Embodiments

The foregoing embodiment has been described on the assumption that the vehicle drawn down state detection process is performed during idle stop control or hill hold control. However, the vehicle drawn down state detection process can also be performed in the other situations. More specifically, as the vehicle drawn down state prevails in a situation where the vehicle acceleration changes from the decelerating direction to the accelerating direction in the no-driving-force state in which the driving force directed in the direction of uphill is not generated in the vehicle, the vehicle drawn down state detection process can be performed in a situation where the no-driving-force state prevails. When, for instance, the clutch is disengaged or the transmission is in neutral (N) position, the vehicle drawn down state detection process can be performed.

Further, if the polarity of the longitudinal acceleration determined from the detection signal of the G sensor 3 changes when the wheel acceleration dVw (i.e., vehicle acceleration) changes from the decelerating direction to the accelerating direction, the present embodiment preferably does not determine that the vehicle is in the vehicle drawn down state. The reason is described below with reference to FIG. 4.

Figure 4:
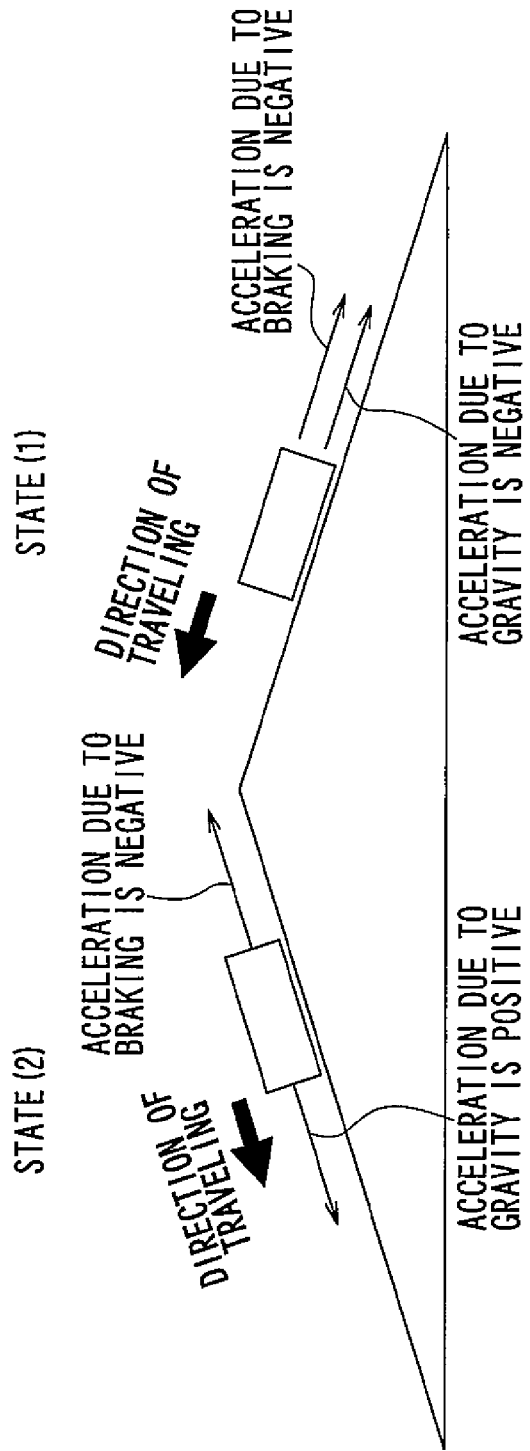
FIG. 4 is a diagram illustrating how the relationship between vehicle accelerations changes when a road on which a vehicle is traveling changes from an uphill to a downhill.

FIG. 4 is a diagram illustrating how the relationship between vehicle accelerations changes when a road on which the vehicle is traveling changes from an uphill to a downhill. First of all, let us assume a case where the road on which the vehicle is traveling changes to a downhill as indicated by state (2) in a situation where the brake pedal is depressed to decelerate the vehicle traveling on an uphill from the right-hand side as indicated by state (1).

In the above case, the wheel acceleration dVw appears as deceleration because the brake is applied, and the degree of deceleration decreases as the vehicle approaches its stopped state. However, the wheel acceleration dVw may increase due to the influence of a downhill after a state transition from state (1) to state (2). The resulting state may be determined as the vehicle drawn down state as the conditions of steps 100 to 130 shown in FIG. 2 are met.

If state (1) prevails in the above situation, the vehicle is an uphill traveling state where the vehicle is traveling in the direction of uphill so that the vehicle acceleration due to braking and the vehicle acceleration due to gravity are both in a negative direction (in a direction opposite to the direction of traveling). If, on the other hand, state (2) prevails, the vehicle is a downhill traveling state where the vehicle is traveling in the direction of downhill so that the vehicle acceleration due to braking is in the negative direction (in a direction opposite to the direction of traveling), and that the vehicle acceleration due to gravity is in a positive direction (in the same direction as the direction of traveling). Therefore, when a state transition occurs from state (1) to state (2), the polarity of the longitudinal acceleration determined in accordance with the detection signal of the G sensor 3 changes from negative to positive.

Consequently, when the longitudinal acceleration is determined in accordance with the detection signal of the G sensor 3, that is, directly detected instead of being calculated, for instance, from the wheel speed or vehicle speed, and found to have changed in polarity, it is preferred that the vehicle be not determined to be in the vehicle drawn down state on the assumption that a state transition has occurred from state (1) to state (2) as mentioned above. This makes it possible to avoid an erroneous detection of the vehicle drawn down state when a state transition has occurred from state (1) to state (2).

The various sections 11-13 of the brake ECU 1 shown in FIG. 1 and the steps indicated in FIG. 2 correspond to means for performing various processes. More specifically, the wheel acceleration calculation section 11 of the brake ECU 1 and a section performing processing step 100 correspond to a vehicle speed detection means and to an indirect longitudinal acceleration calculation means; the road surface gradient estimation section 12 and a section performing processing step 110 correspond to an uphill travel detection means; the vehicle control request section 13 and a section performing processing step 130 correspond to a drive state determination means; and the vehicle drawn down state detection section 13*a* and a section performing processing step 140 correspond to a vehicle drawn down state detection means.

LIST OF REFERENCE SIGNS

1 . . . Brake ECU
2 . . . Wheel speed sensor
3 . . . G sensor
4 . . . Brake switch
5 . . . Engine ECU
6 . . . Idle stop ECU
7 . . . Engine
11 . . . Wheel acceleration calculation section
12 . . . Road surface gradient estimation section
13 . . . Vehicle control request section
13*a* . . . Vehicle drawn down state detection section

The invention claimed is:

1. A vehicle drawn down state detection device comprising:
   a vehicle speed detection means that detects a speed of a vehicle;
   an indirect longitudinal acceleration calculation means for indirectly calculating a longitudinal acceleration by calculating the longitudinal acceleration, which is an acceleration in a longitudinal direction of the vehicle, from change in the speed of the vehicle detected by the vehicle speed detection means;
   a drive state determination means that determines a state on generation of a driving force for the vehicle;
   an uphill travel detection means that detects an uphill traveling state in which the vehicle is traveling on an uphill in a direction of uphill;
   a vehicle drawn down state detection means for detecting a vehicle drawn down state in which the vehicle moves on the uphill in a direction opposite to the direction of uphill; and
   a direct longitudinal acceleration detection means for directly detecting longitudinal acceleration including a gravitational acceleration applied to the vehicle,
   wherein, when the uphill travel detection means detects the uphill traveling state and the drive state determination means detects a no-driving-force state in which the driving force for the vehicle is not generated, the vehicle drawn down state detection means detects that the longitudinal acceleration indirectly calculated by the indirect longitudinal acceleration calculation means is oriented in an accelerating direction, and determines that the vehicle is in the vehicle drawn down state, and
   wherein, if change occurs in a polarity of the longitudinal acceleration including the gravitational acceleration detected by the direct longitudinal acceleration detection means when the longitudinal acceleration indirectly calculated by the indirect longitudinal acceleration calculation means is oriented in the accelerating direction, the vehicle drawn down state detection means does not determine that the vehicle is in the vehicle drawn down state.

2. The vehicle drawn down state detection device according to claim 1, wherein, when at least one of a stopped engine, a disengaged clutch, and a transmission in neutral position is detected, the drive state determination means determines that the vehicle is in the no-driving-force state.

3. A vehicle control device that comprises the vehicle drawn down state detection device according to claim 1 and exercises vehicle control in accordance with the result of detection by the vehicle drawn down state detection device, the vehicle control device comprising an engine start means that exercises idle stop control for purpose of the vehicle control so as to automatically stop an engine when stopping the vehicle and automatically restart the engine when starting the vehicle, and starts the engine if the vehicle drawn down state is detected by the vehicle drawn down state detection device during the idle stop control.

4. A vehicle control device that comprises the vehicle drawn down state detection device according to claim 1 and exercises vehicle control in accordance with the result of detection by the vehicle drawn down state detection device, the vehicle control device comprising a braking force increase means that exercises for purpose of the vehicle control so as to increase a braking force of the vehicle when the vehicle drawn down state is detected by the vehicle drawn down state detection device.

* * * * *